(12) United States Patent
Garabedian (10) Patent No.: US 12,381,401 B2
(45) Date of Patent: Aug. 5, 2025

(54) VARIABLE INVERTER BASED POWER CONTROL

(71) Applicant: ELECTRIC HYDROGEN CO., Natick, MA (US)

(72) Inventor: Raffi M. Garabedian, Los Altos, CA (US)

(73) Assignee: ELECTRIC HYDROGEN CO., Devens, MA (US)

(*) Notice: Subject to any disclaimer, the term of this patent is extended or adjusted under 35 U.S.C. 154(b) by 0 days.

(21) Appl. No.: 18/688,942

(22) PCT Filed: Dec. 8, 2022

(86) PCT No.: PCT/US2022/052229
§ 371 (c)(1),
(2) Date: Mar. 4, 2024

(87) PCT Pub. No.: WO2023/107607
PCT Pub. Date: Jun. 15, 2023

(65) Prior Publication Data
US 2024/0372371 A1    Nov. 7, 2024

Related U.S. Application Data (60) Provisional application No. 63/287,224, filed on Dec. 8, 2021.

(51) Int. Cl.
*H02J 3/38* (2006.01)
*C25B 1/04* (2021.01)
*C25B 9/70* (2021.01)
*C25B 15/02* (2021.01)

(52) U.S. Cl.
CPC ............ *H02J 3/381* (2013.01); *C25B 1/04* (2013.01); *C25B 9/70* (2021.01); *C25B 15/02* (2013.01); *H02J 2300/24* (2020.01); *H02J 2300/40* (2020.01)

(58) Field of Classification Search
CPC .......... H02J 3/38; H02J 3/381; H02J 2300/40; H02J 2300/24; C25B 9/70; C25B 1/04; C25B 15/02
See application file for complete search history.

(56) References Cited

U.S. PATENT DOCUMENTS

| | | |
|---|---|---|
| 2010/0114395 A1 | 5/2010 | Hinatsu et al. |
| 2014/0097093 A1 | 4/2014 | Showalter et al. |
| 2020/0130527 A1 | 4/2020 | Brombach et al. |
| 2021/0156039 A1 | 5/2021 | Ballantine et al. |
| 2021/0317588 A1 | 10/2021 | Falk et al. |

OTHER PUBLICATIONS

Written Opinion of the International Searching Authority for PCT/US2022/052229, mailed Mar. 28, 2023, pp. 1-10.

*Primary Examiner* — Robert L Deberadinis
(74) *Attorney, Agent, or Firm* — Lempia Summerfield Katz LLC (57) ABSTRACT

A DC power output system may achieve variable output power by paring a variable inverter with a rectifier. DC power output system may implement DC power adjustment at the output of the rectifier least in part by varying the power supplied from the variable inverter to the rectifier.

20 Claims, 5 Drawing Sheets

Figure 5

VARIABLE INVERTER BASED POWER CONTROL

PRIORITY

This application is a § 371 nationalization of PCT Application Serial No. PCT/US2022/052229, filed Dec. 8, 2022, designating the United States, which claims priority to U.S. Provisional Application No. 63/287,224, filed Dec. 8, 2021, and titled VARIABLE INVERTER BASED POWER CONTROL, which are incorporated by reference herein in their entireties.

BACKGROUND

Technical Field

The disclosure relates generally to variable inverter based power control.

Brief Description of Related Technology

Electrolyzer systems use electrical energy to drive a chemical reaction. For example, water is split to form hydrogen and oxygen. The products may be used as energy sources for later use. In recent years, improvements in operational efficiency have made electrolyzer systems competitive market solutions for energy storage, generation, and/or transport. For example, the cost of generation may be below $10 per kilogram of hydrogen in some cases. Increases in efficiency and/or improvements in operation will continue to drive installation of electrolyzer systems.

DETAILED DESCRIPTION

The discussed architectures and techniques may support large-scale (and/or other scale) electrolysis systems that are directly or virtually connected to a renewable generation energy source, and/or electrolysis systems that provide grid services. Thus architectures and techniques described here can also be applied to electrochemical processes other than electrolysis, for example electrochemical reduction of oxide ores, chloralkali processes and/or other electrochemical processes that are powered by resources utilizing one or more controllable power converters.

In some cases, renewable energy sources, which may be used to power an electrolyzer system, can have output that changes over time. For example, a solar generation system may produce little or no real power at night and power that fluctuates continuously during the day due to atmospheric changes. In normal grid-connected operation as a power generator, the power converters in such a system match the fluctuating input power to the fixed, specified grid frequency and voltage with a high degree of precision. Such precise regulation of frequency and voltage is a design criteria for grid connected renewable power converters, since the point of interconnection to the grid is low impedance ("stiff" in electrical terms). Further, target utilization of an electrolyzer system may change over time. For example, an electrolyzer system including multiple electrolyzer stacks may run at or near full capacity during one part of a particular day and below half-capacity during another part of the same day. Accordingly, the techniques and architectures discussed herein may provide electric systems that may support variable power output, e.g., for electrolysis systems and/or other systems with transient power demand.

Electrolyzer systems may include one or more electrolyzer stacks. Each stack may be independently connected to power electronics, water, and gas systems. In some cases, a subgroup of electrolyzer stacks may be coupled together for parallel control. Each stack and/or sub-group can be controlled independently with an electrolyzer stack controller.

In some cases, DC (direct current) substations may include a rectifier that may be used to control the DC power output of the substation. In various contexts, the output of the DC substation may be used to provide power an electrolyzer system. Nevertheless, DC substations may be used to power a variety of systems that rely on controllable output. Various types of controlled rectifiers may provide the controlled output. The availability of controlled rectifiers has resulted in an unrecognized need for market alternatives.

In some cases, if the cost of a controlled rectifier could be avoided the overall cost of a DC substation may be reduced. Accordingly, the techniques and architectures discussed herein may provide systems that use variable inverters paired with rectifiers that are uncontrolled and/or those that may not necessarily provide the entire power variability relied on by the consumer of the DC substation (or other DC supply system) output. Thus, the techniques and architectures discussed herein (including the paring of a variable inverter for power control with a rectifier) provide improvements (e.g., reduced cost/reconfiguration of existing equipment) over existing market base solutions. Further, the techniques and architectures provide the unexpected results of DC power control achieved through control of AC (alternating current) inputs.

Figure 1:
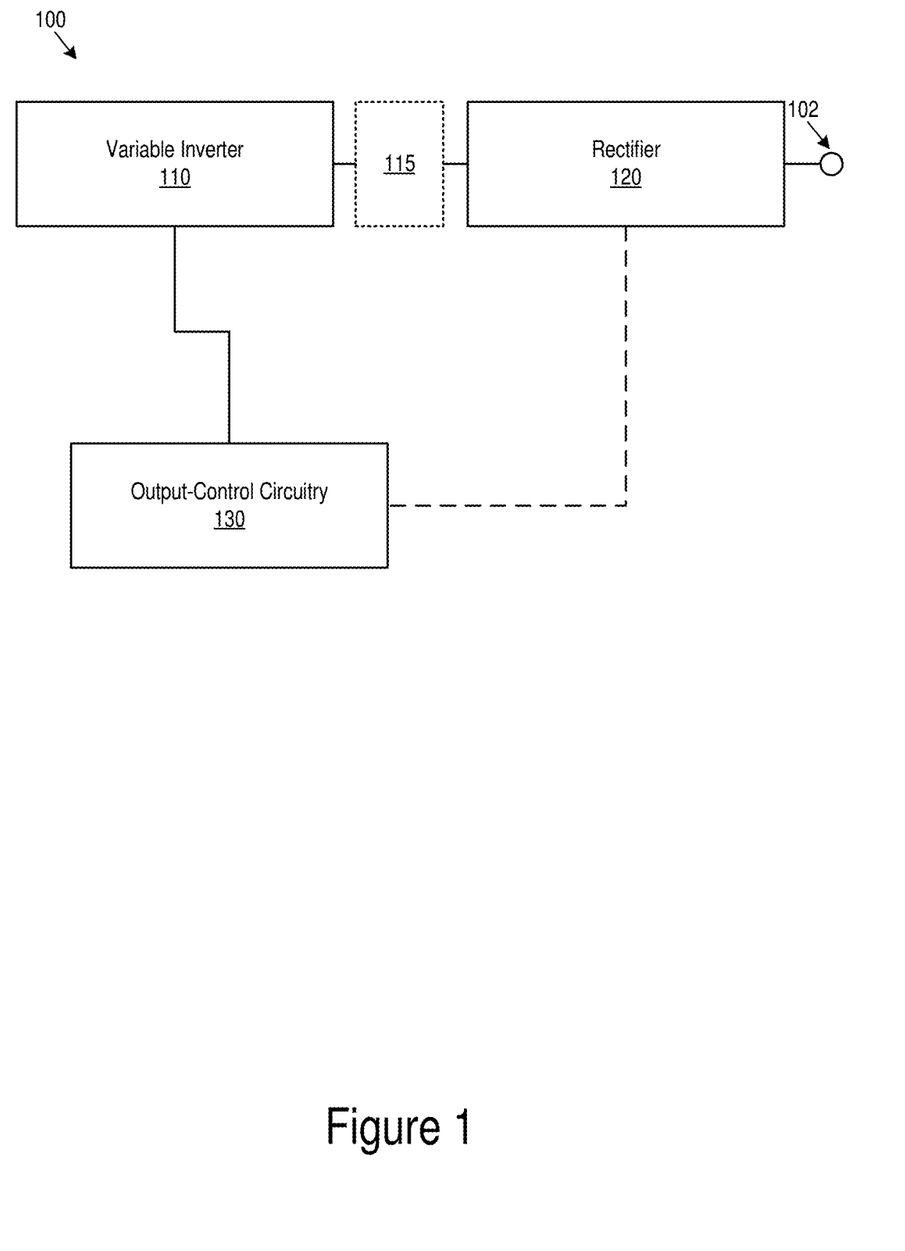
FIG. 1 shows an example DC power output system.

FIG. 1 shows an example DC power output (DCPO) system 100. The example DCPO 100 includes an output port 102, a variable inverter 110, a rectifier 120 coupled between the output port 102 and the variable inverter 110, and output-control circuitry 130. The rectifier 120 may be configured to convert AC power of the variable inverter to DC power at the output port. Various rectifier types may be used. For example, a diode rectifier may be used. In some implementations, a transformer 115 may be coupled between the variable inverter 110 and the rectifier 120. Various transformers may be used, for example, low, medium, and/or high voltage transformers may be used.

Figure 2:
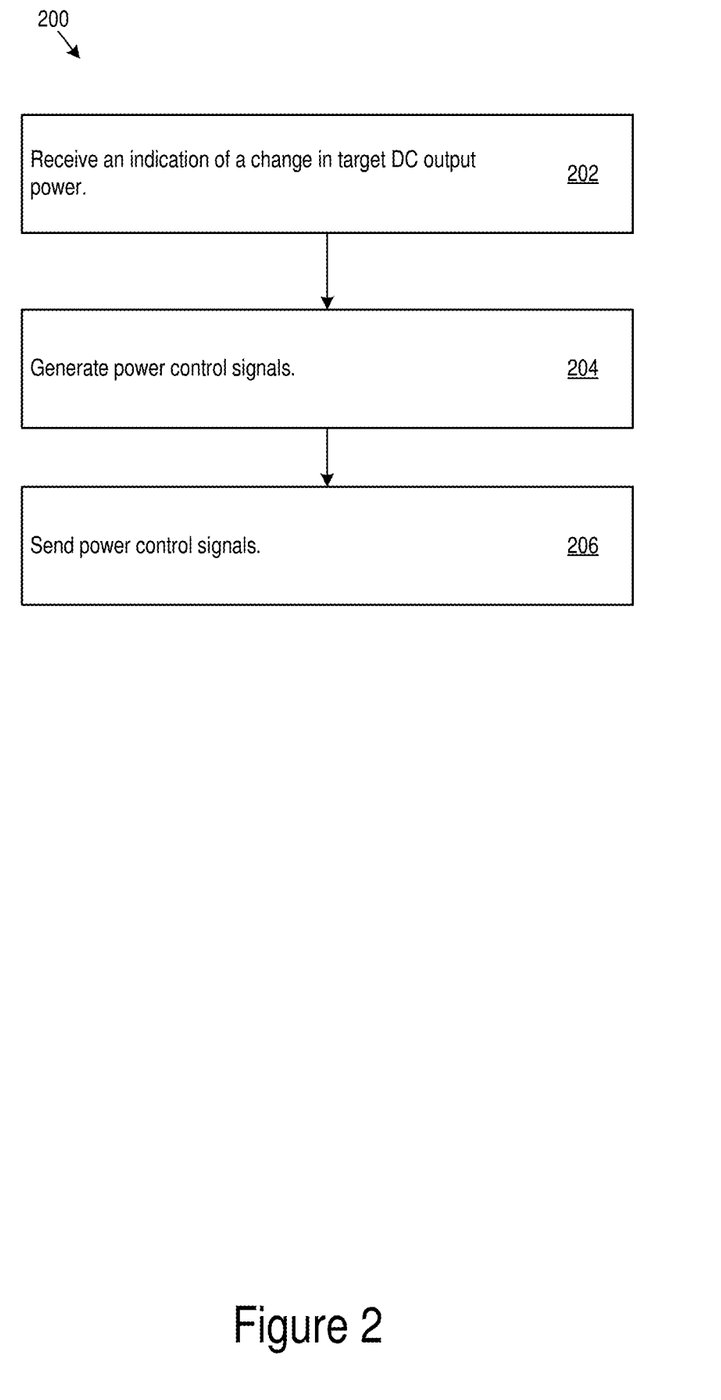
FIG. 2 shows example output-control logic.

While continuing to refer to FIG. 1 and now additionally referring to FIG. 2, FIG. 2 shows example output-control logic (OCL) 200, which my govern operation of the output-control circuitry 130. The OCL 200 may receive an indication of a change in target DC power output for the output port 102 (202). For example, the OCL 200 may receive an indication of an operational state change occurring for one or more consumers of the power. For example, an electrolyzer system may be moving (or partially moving) to a standby state from an active state. Illustrative example electrolyzer operating states are discussed below with regard to FIG. 3. In some cases, the configuration of one or more electrolyzer stacks may be changing. For example, chemical generation may be undergoing consolidation to fewer stacks at a higher operation power. Accordingly, one power supply may adjust one output upward while adjusting another output downward.

The OCL 200 may generate a power control signal based on the change—e.g., to account for the corresponding adjustment (204). While the rectifier 120 remains unadjusted responsive to the change, the OCL 200 may send a power control signal to drive the variable inverter 110 to a target AC power to account for the change in target DC power output (206) at the output 102. For example, the rectifier may remain unadjusted by virtue of being an uncontrolled rectifier. In some cases, the rectifier may remain unadjusted because the OCL 200 holds the signals controlling the rectifier constant (or e.g., where dynamic corrections are occurring, the signals hold the rectifier in a constant operational mode) or otherwise effect the change entirely with the variable inverter 110).

In some cases, the OCL 200 may account for the change using both the rectifier 120 and the variable inverter 110. Accordingly, the rectifier 120 may be controlled and adjusted in response to the change, but the rectifier 120 need not necessarily be configured to handle to whole of the change and/or the full power variation required by the consumer of the DC output from the output port. For example, partial use of the variable inverter 110 may reduce the overall constraints on the capabilities of the rectifier 120. Accordingly, even in cases where an uncontrolled rectifier is not necessarily used, a rectifier with variability less than the full variability called for by the particular application may be used.

In some implementations, multiple inverter-rectifier pairs may be controlled by the output-control circuitry 130. The multiple inverter-rectifier pairs may be each associated with one or more electrolyzer stacks and/or selectively output coupled to the power grid. The multiple inverter-rectifier pairs may be used to implement load balancing among electrolyzer stacks. For example, the multiple inverter-rectifier pairs may be cycled according to a scheme (e.g., round robin, stack age based, equalized chemical output, and/or other usage cycling schemes) to balance the usage of the various electrolyzer stacks, e.g., during periods where the electrolyzer system as a whole is operating at less than 100% capacity (or less than some other defined full load). In some cases, for operational efficiency, it may be desirable to consolidate chemical generation at fewer stacks running at higher loads than to generate the same amount of chemical across more stacks at a comparatively lower load. In some cases, as chemical output decreases, stacks may be taken offline or placed into a standby state (as described below) rather than remain in an active chemical generating state to implement a preference for consolidation of chemical production at fewer stacks.

In some implementations, as discussed above, the rectifier 120 may be a controlled rectifier capable of adjustment. However, in some cases, the range of adjustment supported by the rectifier 120 may be less than that used to support operation of various systems coupled to the DCPO 100. For example, the rectifier 120 may support less than 50% of the range, less than 10% of the range, or other portion.

Figure 3:
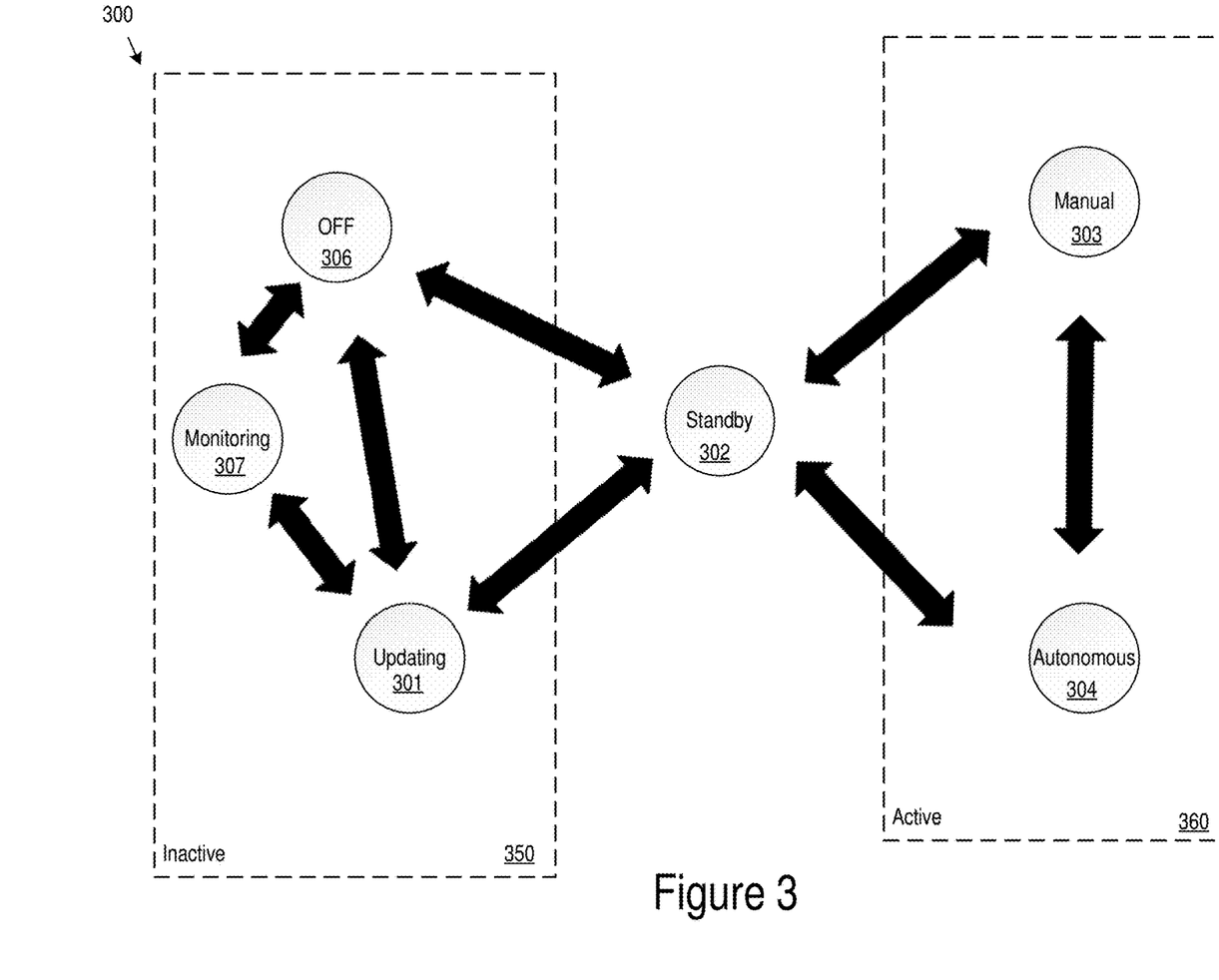
FIG. 3 depicts an example of a state diagram for site control an electrolyzer system.

FIG. 3 depicts an example of a state diagram 300 to site control an electrolyzer system. Various example states are shown. The state diagram includes standby 302, inactive 350, and active 360 states.

The monitoring state 307 is a low-power monitoring only mode where auxiliary systems may be off-line.

The off state 306 may include one of a spectrum of low power and full off modes. The off state may be used in conjunction with timings to initiate (temporary) transition to the monitoring state to poll sensors. In some cases, the off state may return to other states as a result of manual commands/interventions. In some cases, the off state (or any of the other inactive states) may include use of battery or other power stores to assist in boot strapping or return to powered states.

The updating state 301 is where the controller is updating the software or firmware of one or more components of the system. The standby state 302 is the standby state where the controller is monitoring, and auxiliary system are typically energized and ready. In this state, the system can transition to active.

Active states include a manual mode 303, where is the system will respond to manual commands, and an autonomous mode 304, where the system will autonomously follow renewable generation within the constraints of the grid, forecast, and pricing signals.

In various cases, the variable inverter 110 may be coupled to an input, such as an input for a power grid and/or electrolyzer stack, that provides voltage at a nominal line voltage. The variable inverter 110 may be used to adjust the nominal line voltage to effect adjustment of voltage at the output 102. For example, the variable inverter 110 may support multiple modes of voltage adjustment. For example, the nominal line voltage may varied over a nominal operation range. As an illustrative example, in a power grid context, the nominal voltage may be a mean, default, industrial standard, or other selected voltage calculated to meet grid demand at least in some cases. The nominal operation range may be range of voltage selected to meet a range (e.g., a full range) of grid demand. For example, an illustrative example nominal range may span from about 88% percent of the line voltage to 110% percent of the line voltage.

Figure 4:
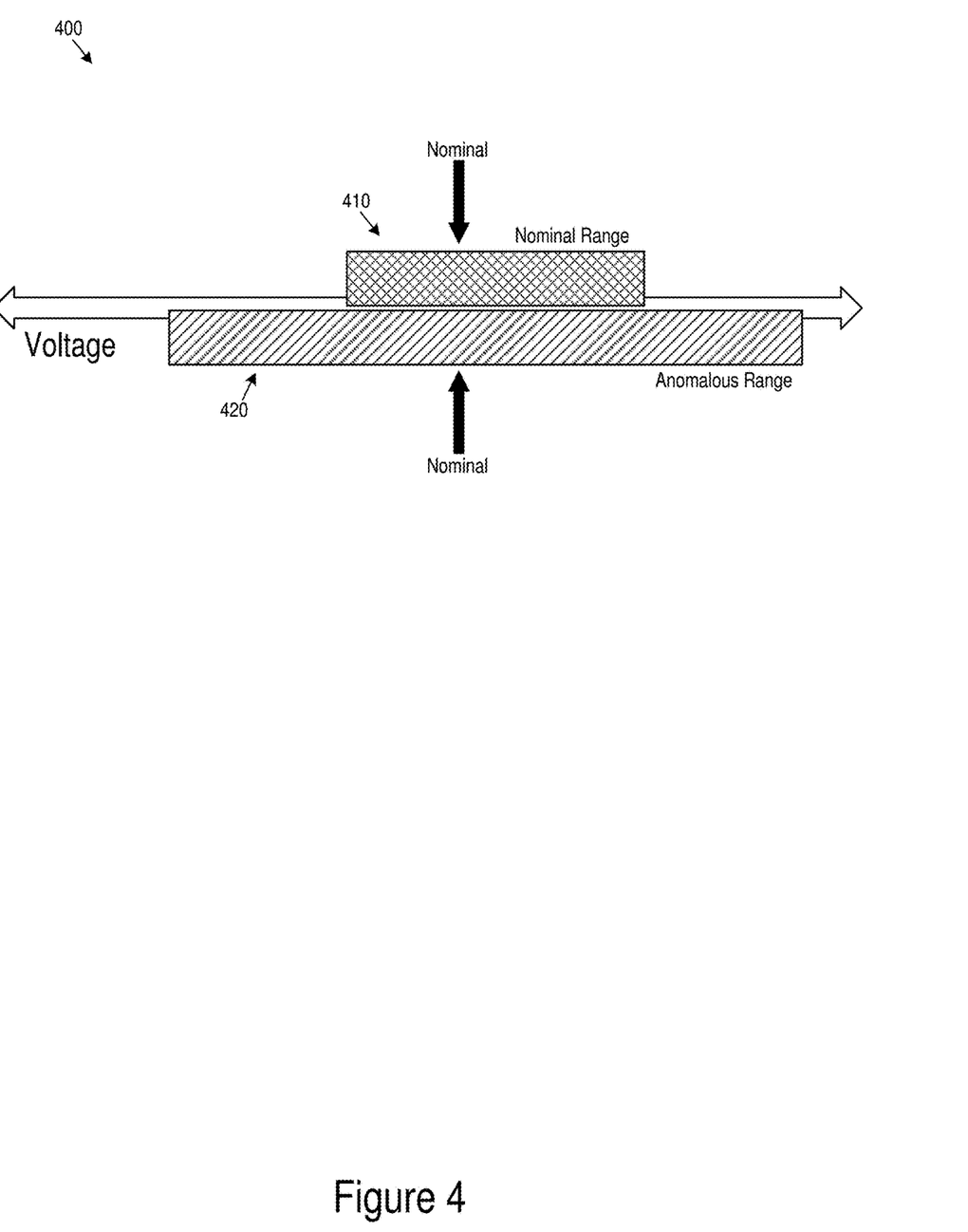
FIG. 4 shows example voltage-adjustment logic.

In various implementations, the variable inverter 110 may be used to adjust the nominal line voltage in an anomalous operation range that is outside the nominal operation range. FIG. 4 shows example voltage-adjustment logic 400 for operation of the variable inverter 110. The voltage-adjustment logic 400, which may be implemented on circuitry, may define one or more operational ranges 410, 420 for the variable inverter 110. The nominal operational range 410 may include an operational range over which the variable inverter 110 operates in a nominal operation mode. The nominal operation mode may include a mode where the allowed range of operation is constrained via one or more defined conditions that may be independent of the supported operational ranges of the hardware. For example, a nominal operation mode may be constrained by defined power grid requirements. For example, the IEEE519 (Institute of Electrical and Electronics Engineers) standards may define constraints for provision of power to a power grid. The power grid may have constrained flexibility because the grid may aim to maintain predictable operation.

The anomalous operational range 420 may include an operational range over which the variable inverter 110 operates in an anomalous operation mode. The anomalous operational range 420 may include voltages outside the nominal operation range due to the absence of constraints. Accordingly, the range may be defined by allowed voltages for the electrical systems being operated. Therefore, while operating in anomalous modes, the variable inverter 110 may vary the voltage levels across the anomalous operational range 420, which may be inclusive of the nominal operational range 410. As an illustrative example, an anomalous operation mode may include a mode in which the example DCPO 100 disconnects from the power grid and instead provides power to a local electrolyzer system. Thus, in the illustrative example, the power requirement of the local electrolyzer system may supplant the grid power regulations. The local electrolyzer system may (e.g., for changing operating states) require a broader variability with regard to power inputs.

For example, the power input to support the local electrolyzer system may depend on the number of electrolyzer stacks running concurrently, the current power state/mode of the local electrolyzer system or individual electrolyzer stacks within the system, the voltage load on each of the currently running electrolyzer stacks, the optimization scheme for cycling electrolyzer stack operation/balancing electrolyzer stack use, total chemical production, the number of electrolyzer stacks produce at least a nominal amount (e.g., a minimum operational quantity) of chemical and/or other factors governing current operation of the local electrolyzer system. Thus, the range of voltages needed to run the local electrolyzer system may be greater than the range needed to comply with power grid regulations. Power control signals from the output-control circuitry 130 may be used to control the operation of the variable inverter 110 to supply power to the local electrolyzer system in accord with the above factors.

Example Implementations

Electrochemical (EC) plants may be powered from using the electric grid by a rectifier which converts Medium Voltage (MV, defined per ANSI C84 as 1 kV to 100 kV, but in many cases less than 35 kV) 3-phase AC to a DC supply at the target operating voltage and current to power the electrochemical process. The rectifier may be referred to as a "DC substation". The DC substation may be tied to a MV distribution line and/or may include switchgear and step-down from the high voltage power transmission network.

In illustrative scenarios where the electrochemical plant can be co-located with the renewable generating plant, the combination of generation and EC plants may be treated as a single system. In this case, the generalized grid connection may not be necessarily needed, and/or may be designed to support a small fraction of the total system power.

Further, photovoltaic (PV) and wind inverters can controllably vary their output AC voltage in order to match grid standards. An example inverter standard provides for the ability to vary AC voltage in the range of 88% to 110% of nominal line voltage without compromising conversion efficiency or power rating and can control below 88% at the expense of power rating.

The example implementations discussed provide a plant architecture and method by which the AC output voltage of the multiplicity of inverters in the renewable plant may be used to control the input current to the co-located electrochemical plant or plants. A second similar option is to use inverters in an output current control configuration (slope control) to achieve the same end.

In other words, the inverters within the renewable plant may be modified in how they are controlled to eliminate the need for a controlled rectifier or DC substation at the downstream electrochemical plant (or in some cases the inclusion may reduce the stringency of the constraints on the performance (e.g., speed/variability). Instead, an uncontrolled diode rectifier or a "less" controlled rectifier may be used.

Figure 5:
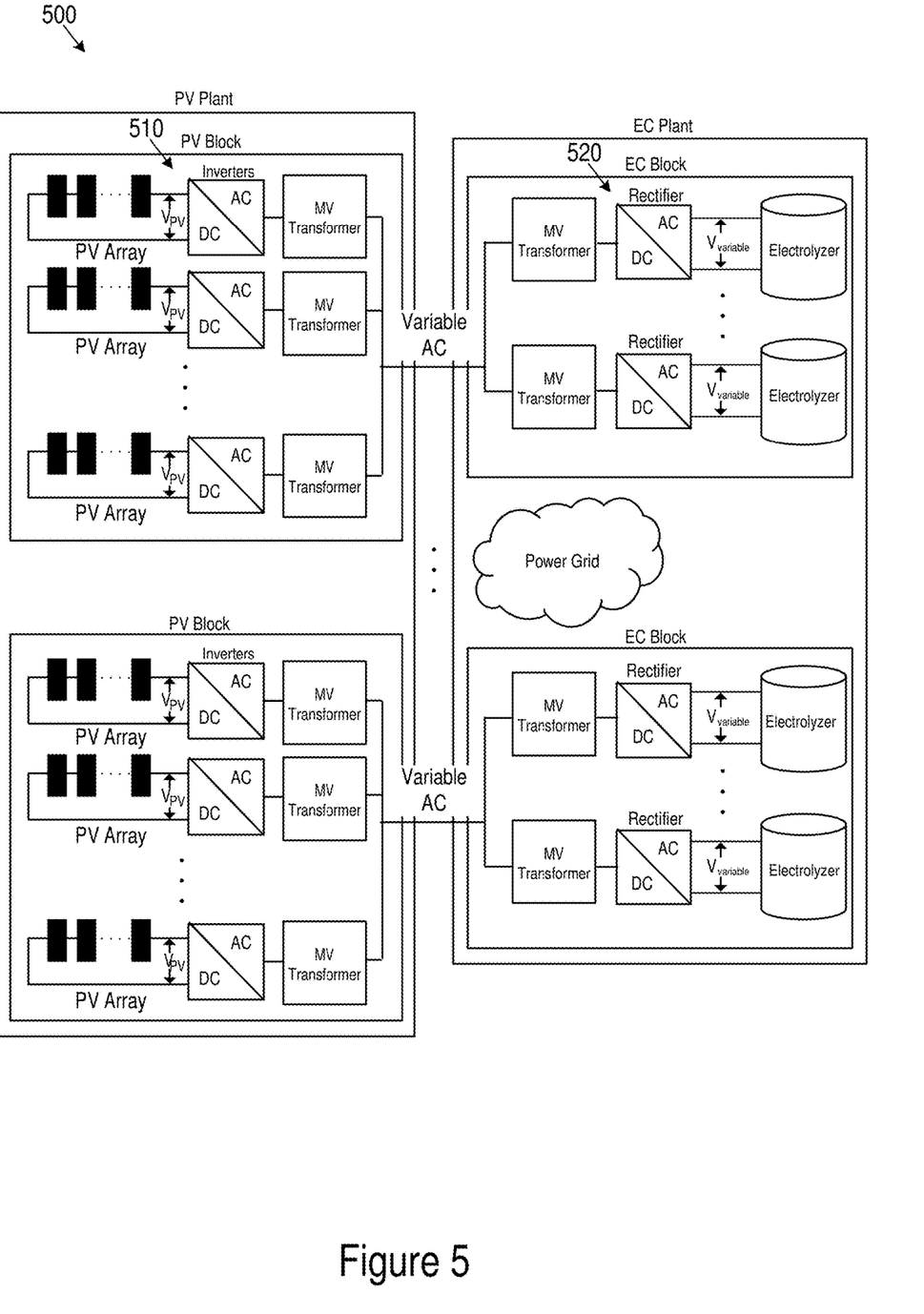
FIG. 5 shows an example implementation of a DC power output system implemented within an electrochemical plant.

FIG. 5 shows an example implementation of a DCPO system 500 implemented within an electrochemical plant. In this example DCPO system 500, the PV plant inverter 510 is controlled/operated outside of the nominal operating range, reducing/eliminating the reliance on the controlled rectifier to provide DC power output adjustments. Instead, in this illustrative example, an uncontrolled diode rectifier 520 is used.

In other words, in order to control the current through the electrochemical plant process, the AC output voltage of the renewable plant inverters is used. This control may be accomplished via an integrated plant controller which sends voltage (or current) control signals to the renewable electricity (RE) plant controller or directly to the arrayed RE inverters.

For example, the output-control circuitry 130, discussed above with respect to FIG. 1, may be localized and/or implemented via distributed components, e.g., via data network/Internet connections.

Various example implementations have been included for illustration. Other implementations are possible. Table 1 includes various examples.

TABLE 1

| Examples |
|---|
| 1. A system including:<br>an output port;<br>a variable inverter;<br>a rectifier coupled between the output port and the variable inverter, the rectifier configured to convert AC power of the variable inverter to DC power at the output port; and<br>output-control circuitry configured to:<br>receive an indication of a change in target DC power output for the output port; and<br>while the rectifier remains unadjusted responsive to the change, send a power control signal to drive the variable inverter to a target AC power to account for the change in target DC power output, where:<br>optionally, the system is in accord with any other example in this table.<br>2. A system including:<br>an output port;<br>a variable inverter;<br>an uncontrolled rectifier coupled between the output port and the variable inverter, the uncontrolled rectifier configured to convert AC power of the variable inverter to DC power at the output port; and<br>output-control circuitry configured to:<br>receive an indication of a change in target DC power output for the output port; and |

TABLE 1-continued

Examples send a power control signal to drive the variable inverter to a target output
power to account for the change in target DC power output, where:
optionally, the system is in accord with any of the other examples in this table.
3. The system of any of the other examples in this table, where the output port
is coupled to supply power to one or more electrolyzer stacks.
4. The system of any of the other examples in this table, where the rectifier
includes a diode rectifier.
5. The system of any of the other examples in this table, where the variable
inverter is coupled to an input at a nominal line voltage, where:
optionally, the variable inverter is configured to vary an AC voltage of the variable
inverter above about 88% of the nominal line voltage;
optionally, the variable inverter is configured to vary an AC voltage below about
110% of the nominal line voltage;
optionally, the variable inverter is configured to vary an AC voltage below about
88%;
optionally, the variable inverter is configured to vary an AC voltage in an
anomalous operation range with a lower power rating than a nominal operation
range of the variable inverter, where optionally the nominal operation range
includes a range for the AC voltage from about 88% to about 110% of the
nominal line voltage and the anomalous operation range includes a range
outside of the nominal operation range.
6. The system of any of the other examples in this table, where the output-
control circuitry is configured to generate the power control signal to adjust the
target DC power output based on a number of active electrolyzer stacks coupled
to the output, where:
optionally, output-control circuitry is configured to generate the power control
signal to adjust the target DC power output further based on a number of
standby-state electrolyzer stacks coupled to the output;
optionally, output-control circuitry is configured to generate the power control
signal to adjust the target DC power output further based on a number of inactive
electrolyzer stacks coupled to the output;
optionally, the number of active electrolyzer stacks coupled to the output is based
on a sum of active electrolyzer stacks producing at least a nominal amount
chemical outputs and active electrolyzer stacks producing less than the nominal
amount or no chemical outputs; and
optionally, the number of inactive electrolyzer stacks coupled to the output is
based on a sum of inactive electrolyzer stacks with no power drawn and inactive
electrolyzer stacks with power draw for one or more electrolyzer control or
monitoring functions.
7. The system of any of the other examples in this table, where: the output-
control circuitry is configured to control multiple inverter-rectifier pairs each
output coupled to one or more electrolyzer stacks, where:
optionally, the output-control circuitry is configured to consolidate chemical
production to fewer electrolyzer stacks at higher operating power in lieu of more
electrolyzer stacks at lower operating power;
optionally, the output-control circuitry is configured to balance usage of electrolyzer
stacks, e.g., by rotating usage or other randomizing assignment or other
operation time balancing scheme.
8. The system of any of the other examples in this table, where the variable
inverter includes a variable inverter configured to, in at least a grid operational
mode, connect a power generator to a utility power grid, where:
optionally, the power generator includes a renewable energy source;
optionally, the power generator includes a solar energy source;
optionally, the power generator includes a photovoltaic array;
optionally, the variable inverter, in a stack operational mode is configured to
decouple from the utility power grid and recouple to a local electrolyzer stack;
optionally, output-control circuitry, in the grid operational mode is configured to
generate the power control signals based on grid power provision standards from
the utility power grid (for example, standards in IEEE519).
9. The system of any of the other examples in this table, further including a
transformer between the variable inverter and the rectifier, where
the transformer includes a low voltage transformer, a medium voltage transformer,
a high voltage transformer, or any grouping thereof.
10. The system of any of the other examples in this table, where the variable
inverter, the rectifier, or both are configured to:
optionally, operate at a medium voltage or a high voltage;
optionally, operate at a voltage above 1 kV;
optionally, operate at a voltage below 100 kV; and
optionally, operate at a voltage below 35 kV.
11. The system of any of the other examples in this table, where the rectifier is
located in a DC substation of an electrolysis plant.
12. The system of any of the other examples in this table, where in lieu of the
rectifier remaining unadjusted, the rectifier is configured to be adjusted in concert
with the variable inverter, where:
optionally, the adjustment to the rectifier accounts for less than about 50% of the
change to the target output power; and
optionally, the adjustment to the rectifier accounts for less than about 10% of the
change to the target output power.

TABLE 1-continued

Examples

13. A method including implementing the system of any of the other examples in this table.
14. A product including:
machine-readable media; and
instructions stored on the machine-readable media configured to cause a machine to perform the method of example 13 or any other example in this table, where:
optionally, the machine-readable media is non-transitory;
optionally, the machine-readable media is other than a transitory signal; and
ontionally, the instructions are executable.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A system including:
an output port;
a variable inverter;
a rectifier coupled between the output port and the variable inverter, the rectifier configured to convert AC power of the variable inverter to DC power at the output port; and
output-control circuitry configured to:
receive an indication of a change in target DC power output for the output port; and
while the rectifier remains unadjusted responsive to the change, send a power control signal to drive the variable inverter to a target AC power to account for the change in the target DC power output.

2. The system of claim 1, where the output port is coupled to supply power to one or more electrolyzer stacks.

3. The system of claim 2, where the output-control circuitry is configured to generate the power control signal to adjust the target DC power output based on a number of the one or more electrolyzer stacks that are in an active state.

4. The system of claim 3, where the output-control circuitry is configured to generate the power control signal to adjust the target DC power output based on a number of the one or more electrolyzer stacks that are in a standby state.

5. The system of claim 3, where the output-control circuitry is configured to generate the power control signal to adjust the target DC power output based on a number of the one or more electrolyzer stacks that are in an inactive state.

6. The system of claim 1, where the output-control circuitry is configured to control multiple inverter-rectifier pairs each output coupled to one or more electrolyzer stacks.

7. The system of claim 1, where the output-control circuitry is configured to consolidate chemical production by driving a first electrolyzer stack to a peak output before activating a second currently inactive electrolyzer stack to consolidate the chemical production.

8. The system of claim 1, where the rectifier includes a diode rectifier.

9. The system of claim 1, where the variable inverter is coupled to an input at a nominal line voltage, where:
the variable inverter is configured to vary an AC voltage in an anomalous operation range with a lower power rating than a nominal operation range of the variable inverter,
where optionally the nominal operation range includes a range for the AC voltage from 88% to 110% of the nominal line voltage and the anomalous operation range includes a range outside of the nominal operation range.

10. The system of claim 1, where the variable inverter is configured to, in at least a grid operational mode, connect a power generator to a utility power grid.

11. The system of claim 10, where the power generator includes: a renewable energy source, a solar energy source, and/or a photovoltaic array.

12. The system of claim 10, where the variable inverter, in a stack operational mode is configured to decouple from the utility power grid and recouple to a local electrolyzer stack.

13. The system of claim 1, further including:
a transformer between the variable inverter and the rectifier.

14. A method including:
for a system including an uncontrolled rectifier coupled between an output port and a variable inverter:
receiving an indication of a change in target DC power output for the output port; and
while the uncontrolled rectifier remains unadjusted responsive to the change, send a power control signal to drive the variable inverter to a target AC power to account for the change in the target DC power output.

15. The method of claim 14, further including powering one or more electrolyzer stacks via the output port.

16. The method of claim 14, where:
the variable inverter is coupled to an input at a nominal line voltage; and
the method further includes varying an AC voltage in an anomalous operation range with a lower power rating than a nominal operation range of the variable inverter, where optionally the nominal operation range includes a range for the AC voltage from 88% to 110% of the nominal line voltage and the anomalous operation range includes a range outside of the nominal operation range.

17. The method of claim 14, further including:
supplying, in at least a grid operational mode, power from a power generator to a utility power grid via the variable inverter.

18. The method of claim 17, where the power generator includes: a renewable energy source, a solar energy source, and/or a photovoltaic array.

19. The method of claim 17, further including, in a stack operational mode:
  decoupling the variable inverter from the utility power grid; and
  recoupling the variable inverter to a local electrolyzer stack.

20. A system including:
an output port;
a variable inverter;
an uncontrolled rectifier coupled between the output port and the variable inverter, the uncontrolled rectifier configured to convert AC power of the variable inverter to DC power at the output port; and
output-control circuitry configured to:
  receive an indication of a change in target DC power output for the output port; and
  send a power control signal to drive the variable inverter to a target output power to account for the change in the target DC power output.

* * * * *